UNITED STATES PATENT OFFICE.

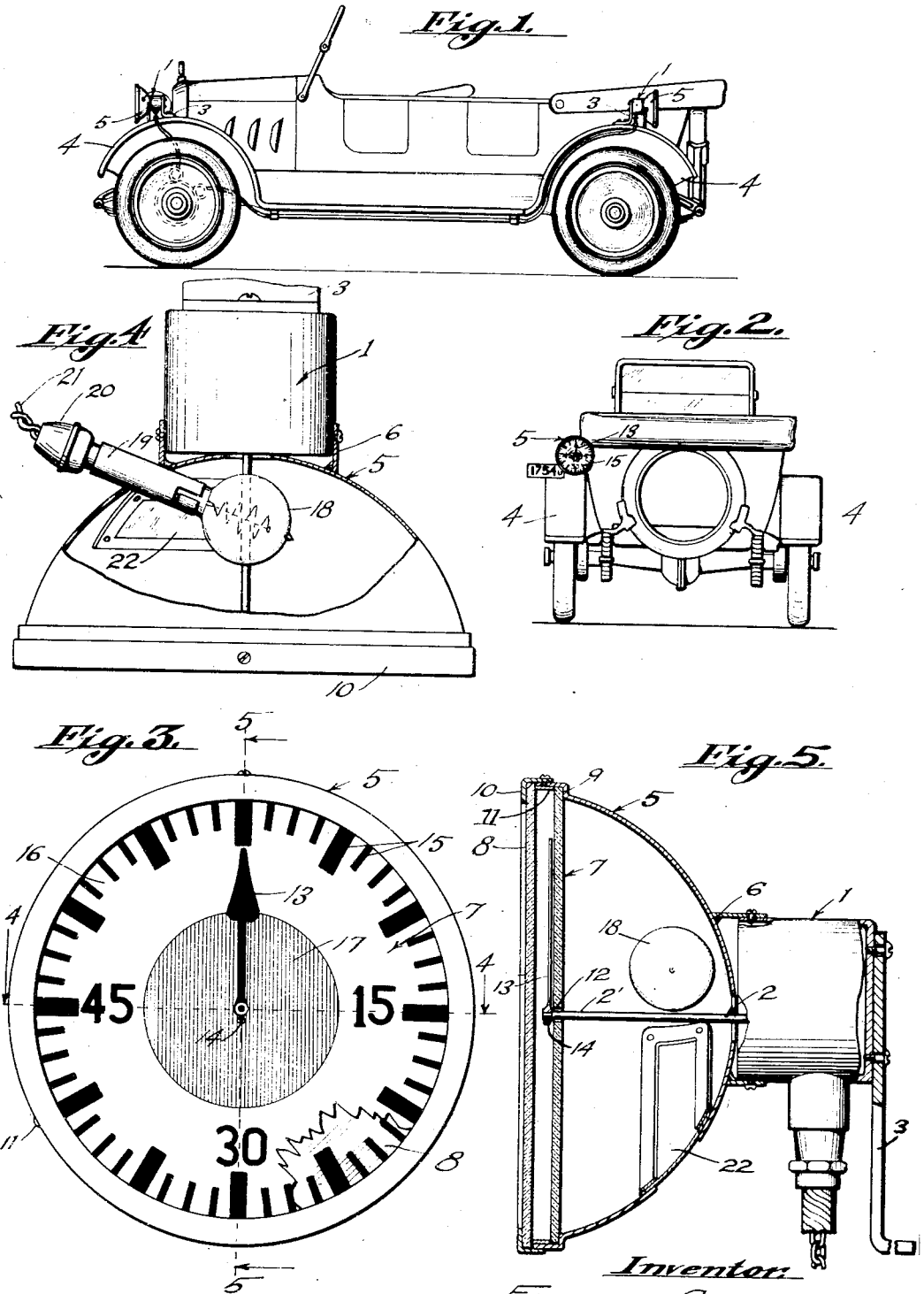

FLORINDA GARDNER, OF SALT LAKE CITY, UTAH.

SPEED-INDICATOR FOR MOTOR-VEHICLES.

1,396,186. Specification of Letters Patent. Patented Nov. 8, 1921.

Application filed April 20, 1920. Serial No. 375,389.

*To all whom it may concern:*

Be it known that I, FLORINDA GARDNER, a citizen of the United States, residing at Salt Lake City, in the county of Salt Lake and State of Utah, have invented new and useful Improvements in Speed-Indicators for Motor-Vehicles, of which the following is a specification.

This invention is a speed indicator, and has for its object the provision of a device which may be mounted upon a conspicuous part of an automobile for example, and which may be readily read from a distance either at day or night.

Further objects of the invention will be readily understood from the following description of the accompanying drawings in which;

Figure 1 is a side elevation of an automobile having the improved speed indicator applied thereto.

Fig. 2 is a rear end view of the same.

Fig. 3 is a front elevation of the indicator.

Fig. 4 is a horizontal section on the line 4—4 of Fig. 3.

Fig. 5 is a vertical section on the line 5—5 of Fig. 3.

In the present embodiment of the invention indicators are shown mounted upon both the front and rear fenders of an automobile at one side thereof. It will be obvious, however, that the indicators may be mounted upon the fenders at both sides of the automobile and upon either the front or rear fenders, or fender thereof, or in any other suitable conspicuous place where the indicators may be read from a position outside of the automobile.

Each of the indicators is shown as comprising a speedometer 1, preferably, of usual construction including the shaft 2 arranged to be rotated proportionally to the speed being measured. A bracket 3 is secured to the speedometer by means of which the speedometer may be suitably mounted as upon the fender 4 of an automobile. A lamp casing 5 is mounted over the front of the speedometer, the lamp casing for this purpose being provided with an annular rearwardly extending collar 6 secured to the casing of the speedometer.

A dial plate 7, preferably, of translucent glass or transparent material having a translucent surface is mounted in the lamp casing and the front end thereof, and a suitable transparent front plate also, preferably, formed of glass is provided over the front of the lamp casing spaced from the dial plate 7. The dial plate 7 is shown as resting against a shoulder 9 provided in the lamp casing, and the front plate 8 is, preferably, held in position by an annular rim 10 extending over the edge of the front plate and suitably secured to the lamp casing. A spacing washer 11 is, preferably, provided between the plates 7 and 8.

The shaft of the speedometer is extended outwardly, as shown at 2', with the end of said shaft projecting through a suitable central aperture 12 in plate 7. A movable indicator such as a pointer 13, preferably of opaque material, is secured upon the end of shaft 2' as by a set screw 14 and this indicator, when shaft 2 is rotated in response to variations of speed, moves over the surface of plate 7 which is suitably graduated as shown at 15, so as to indicate or register the speed of the vehicle. The graduations 15 are, preferably, of black paint upon the translucent surface 16, and the central portion of the dial plate 7 is, preferably, painted a contrasting color, as shown at 17, which may be red in order to provide a usual tail light.

Means are provided within the lamp casing 5 for illuminating the dial plate 7, such means being shown as a lamp 18 suitably supported within the lamp casing. The lamp may be a usual incandescent electric lamp mounted in a socket 19 projecting laterally from lamp casing and having the usual connection 20 at its outer end for the electric conductor wires 21. When the device is mounted upon a rear fender of an automobile and is used as the tail light for the automobile, a window 22 is, preferably, provided in the lamp casing through which a portion of the light from lamp 18 will be deflected downwardly on to the vehicle license plate in usual manner.

The sides of the lamp casing flare outwardly from the speedometer and the dial plate 7 is accordingly a relatively large dial plate and the graduations thereon are made comparatively large, so that the dial may be read from a considerable distance. Furthermore, by the use of a lamp in rear of the translucent dial surface 16, the indicator may be read at night as well as during the day, since the shadow of the pointer or indicating member 13 upon the dial will be visible to show its relative position upon the dial plate 7 even though the figures adjacent to the graduations 15 cannot be read.

Various changes may be made without departing from the spirit of the invention as claimed.

What is claimed is:

In a speed indicator for motor vehicles, the combination with a speedometer, of a housing detachably applied to and extending forwardly from said speedometer, a source of light within said housing, there being a glazed opening formed in the wall of said housing below and to one side of said source of light, a translucent dial plate arranged in the front of the housing, said speedometer including a shaft that extends through the center of the dial plate, an opaque pointer carried by the forward end of said shaft and positioned immediately in front of said dial plate, and the central portion of said dial plate being distinctively colored.

In testimony whereof I have signed my name to this specification.

FLORINDA GARDNER.